(12) United States Patent
Winkelmann et al.

(10) Patent No.: US 9,814,343 B2
(45) Date of Patent: Nov. 14, 2017

(54) WATER DRAWER AND APPLIANCE COMPRISING A WATER DRAWER

(75) Inventors: Klaus Winkelmann, Rothenburg/Tauber (DE); Wolfgang Kraus, Furth (DE); Christina Lowe, Rothenburg/Tauber (DE); Lorenzo Gattei, Forli (IT); Marco Saporetti, Forli (IT)

(73) Assignee: Electrolux Home Products Corporation, Brussels (BE)

( * ) Notice: Subject to any disclaimer, the term of this patent is extended or adjusted under 35 U.S.C. 154(b) by 273 days.

(21) Appl. No.: 14/115,683

(22) PCT Filed: Jul. 16, 2012

(86) PCT No.: PCT/EP2012/063901
§ 371 (c)(1),
(2), (4) Date: Nov. 5, 2013

(87) PCT Pub. No.: WO2013/014014
PCT Pub. Date: Jan. 31, 2013

(65) Prior Publication Data
US 2014/0251304 A1    Sep. 11, 2014

(30) Foreign Application Priority Data

Jul. 27, 2011  (EP) .................................. 11175641
Sep. 9, 2011  (EP) .................................. 11180747

(51) Int. Cl.
*A47J 27/04* (2006.01)
*A47J 36/00* (2006.01)
(Continued)

(52) U.S. Cl.
CPC ........... *A47J 27/04* (2013.01); *A47J 31/4403* (2013.01); *A47J 36/00* (2013.01); *F24C 15/327* (2013.01)

(58) Field of Classification Search
CPC ........ A47J 27/04; A47J 36/00; A47J 31/4403; F24C 15/327
(Continued)

(56) References Cited

U.S. PATENT DOCUMENTS 2,614,022 A * 10/1952 Kurtzon ................. A47B 88/10
                                                          312/334.9
4,384,873 A *  5/1983 Herr ....................... B01D 45/02
                                                          239/121
(Continued)

FOREIGN PATENT DOCUMENTS

DE    102006034081    1/2008
DE    102007048200    4/2009
(Continued)

OTHER PUBLICATIONS

International Search Report for PCT/EP2012/063901, dated Oct. 10, 2012, 2 pages.

*Primary Examiner* — Avinash Savani
*Assistant Examiner* — Rabeeul Zuberi
(74) *Attorney, Agent, or Firm* — Pearne & Gordon LLP

(57) ABSTRACT

The invention relates to a water drawer (1), comprising a housing element (2) and a drawer element (3), wherein the drawer element (3) is movably guided within the housing element (2) and wherein water can be filled into a water receiving space of the drawer element (3), wherein the drawer element (3) can be moved in a translational movement between a first inner position (IN) and a second outer position (OUT), characterized in that the water drawer (1) further comprises at least one driving element (16) for providing a driving force for driving the drawer element (3) to move into the second outer position (OUT).

38 Claims, 7 Drawing Sheets

Figure 1:
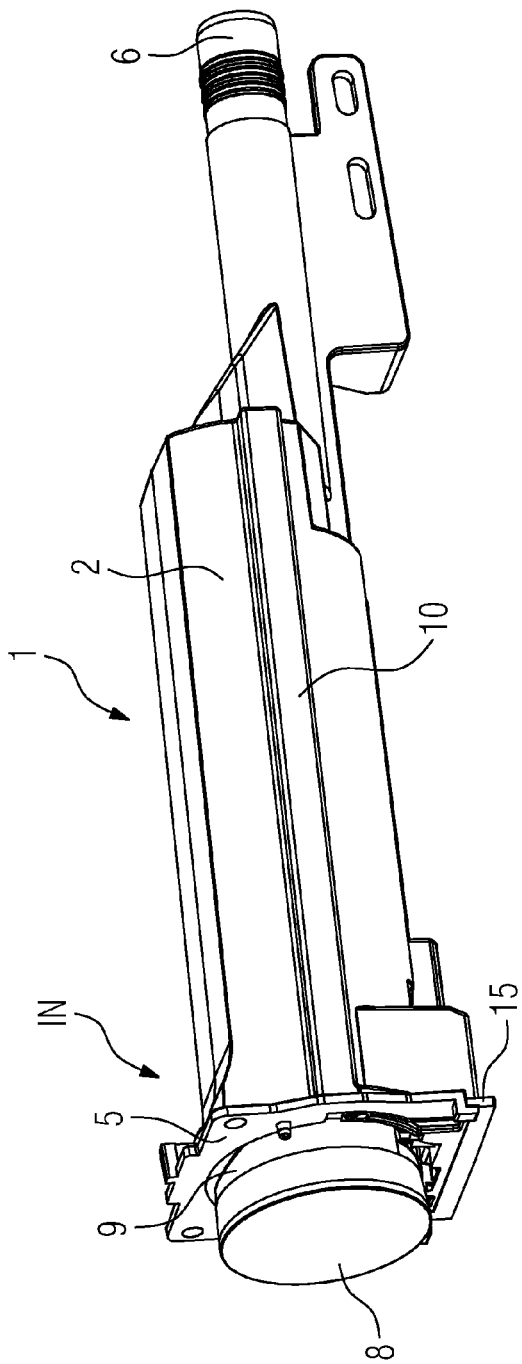

(51) Int. Cl.
*A47J 31/44* (2006.01)
*F24C 15/32* (2006.01)

(58) Field of Classification Search
USPC .............. 312/334.7, 334.27, 334.14, 333;
126/369.1, 377.1, 380.1, 5, 53, 20, 34, 78
See application file for complete search history.

(56) References Cited

U.S. PATENT DOCUMENTS

| | | | | |
|---|---|---|---|---|
| 4,441,773 | A * | 4/1984 | Leiper | A47B 88/14 312/330.1 |
| 5,207,781 | A * | 5/1993 | Rock | A47B 88/047 312/319.1 |
| 6,247,733 | B1 * | 6/2001 | Weiland | E05B 39/00 292/228 |
| 6,666,306 | B2 * | 12/2003 | Gasser | A47B 88/047 16/64 |
| 7,882,796 | B2 * | 2/2011 | Radow | A47B 69/00 312/330.1 |
| 2003/0107308 | A1 * | 6/2003 | Kueng | A47B 88/0455 312/334.1 |
| 2003/0150704 | A1 * | 8/2003 | Posada | B01D 1/04 203/1 |
| 2005/0155535 | A1 * | 7/2005 | Rieke | F23J 13/00 110/349 |
| 2008/0075823 | A1 * | 3/2008 | Jeon | F24C 15/327 426/510 |
| 2008/0310940 | A1 * | 12/2008 | Yamada | B41J 3/4071 414/222.04 |
| 2009/0031902 | A1 * | 2/2009 | White | A47J 31/42 99/289 R |
| 2010/0175435 | A1 * | 7/2010 | Shin | D06F 39/02 68/17 R |

FOREIGN PATENT DOCUMENTS

| | | |
|---|---|---|
| EP | 0092851 | 11/1983 |
| EP | 0388751 | 9/1990 |
| EP | 0648457 | 4/1995 |
| EP | 1192888 | 4/2002 |
| EP | 1906099 | 4/2008 |
| EP | 2080457 | 7/2009 |

* cited by examiner

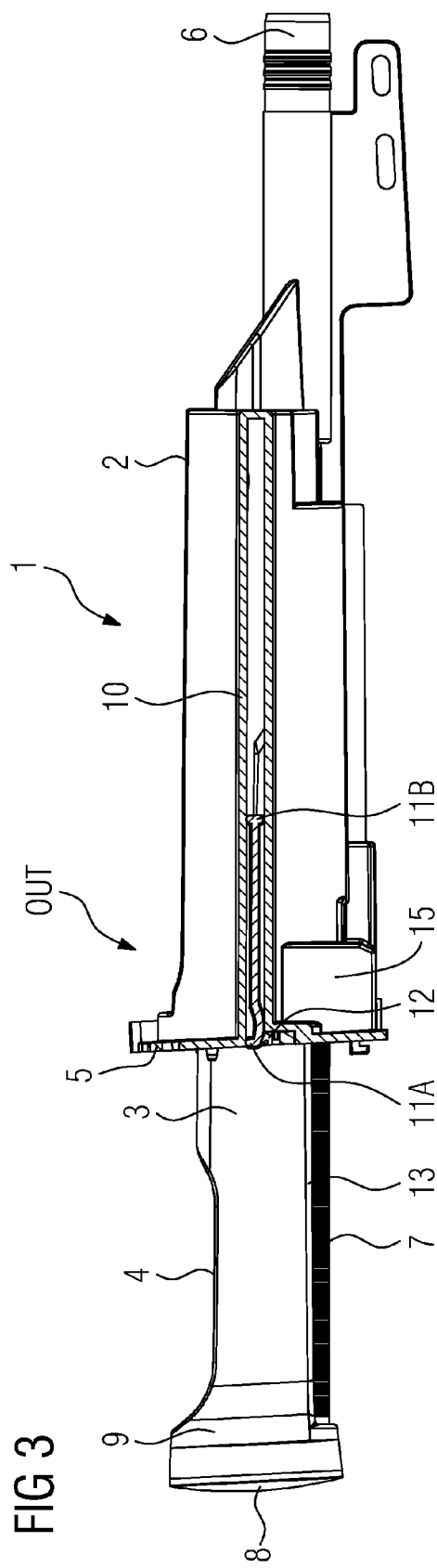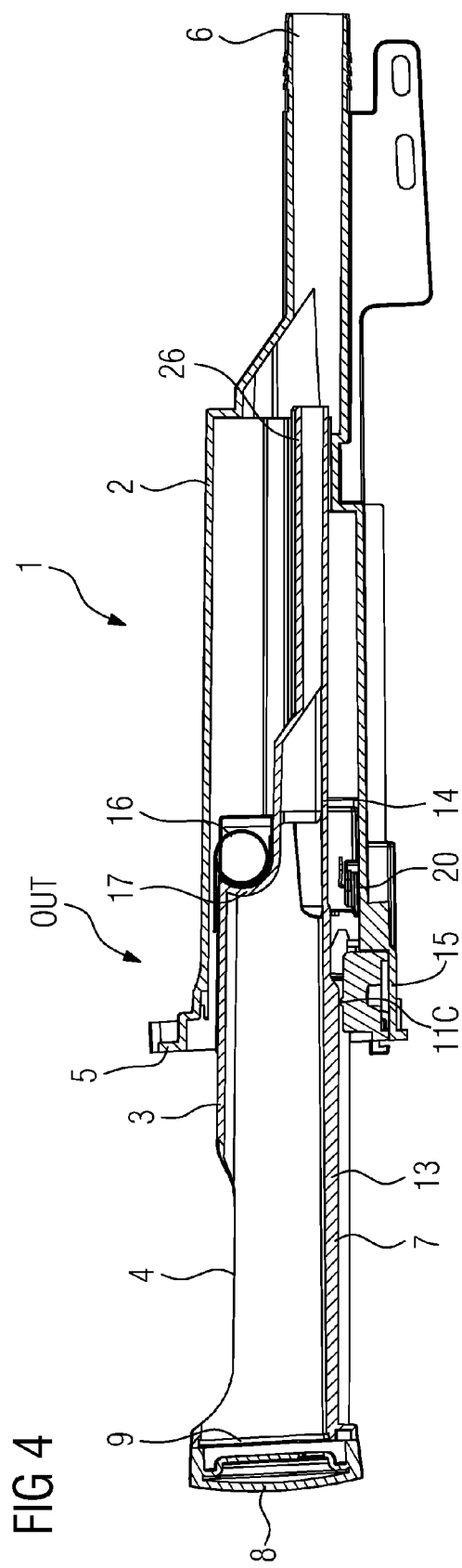

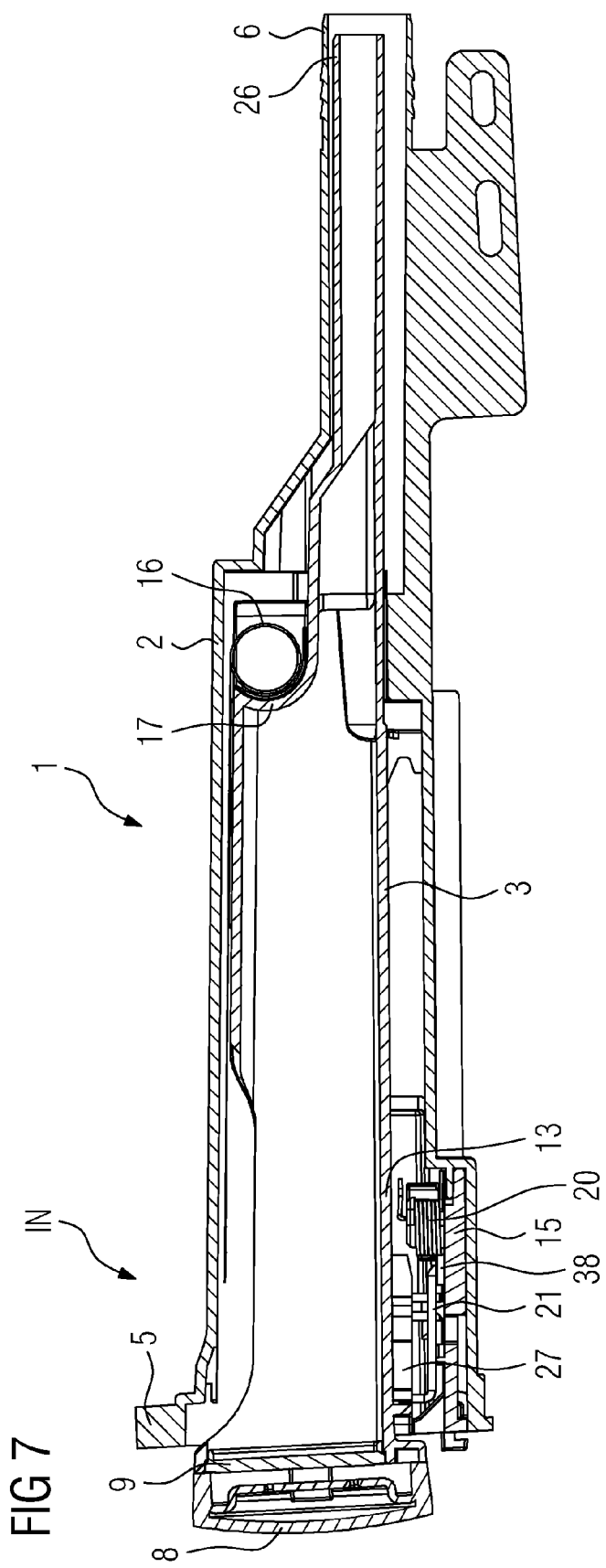

FIG 9
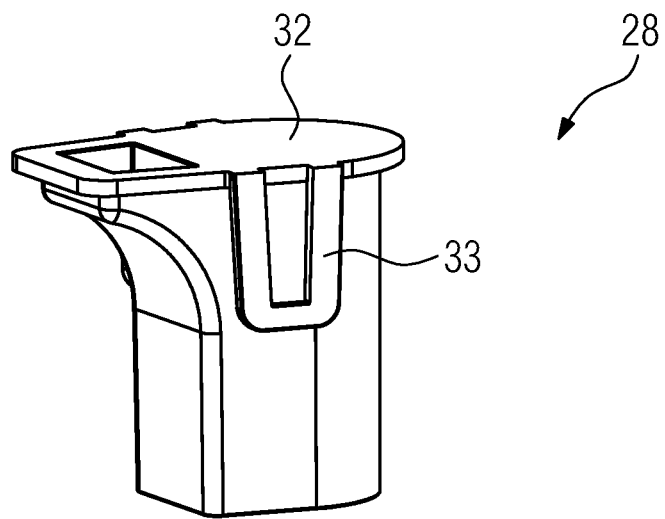
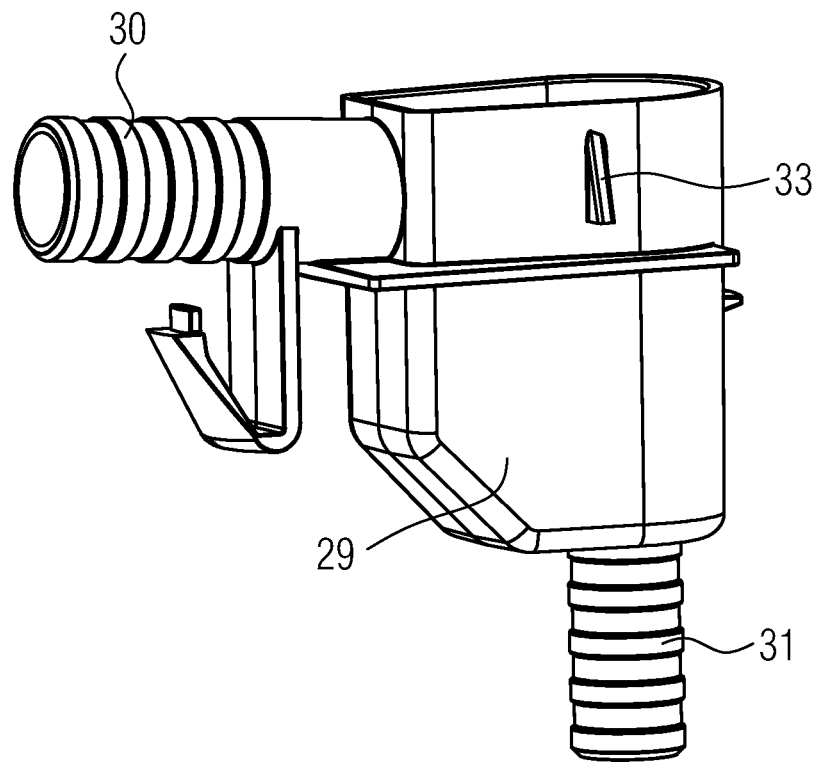

WATER DRAWER AND APPLIANCE COMPRISING A WATER DRAWER

The invention relates to a water drawer, comprising a housing element and a drawer element, wherein the drawer element is movably guided within the housing element and wherein water can be filled into a water receiving space of the drawer element, wherein the drawer element can be moved in a translational movement between a first inner position and a second outer position.

Especially in the case of steamers a water tank is required in appliances such as cooking appliances with steamer function or other domestic appliances where water can be deposited, e.g. to be used for the steam cooking process. In pre-known appliances the water tank has at least one handle for taking it out from the appliance to fill it with water. Also a handle can be arranged at the filling element to pull it out from an idle position into a filling position in which water can be filled into the water tank. After completion of the filling process the filling element can be pushed back from the filling position into the idle position.

Thus the grip or handle for pulling out the filling element is arranged outside of the filling element itself and thus forms a part which disturbs the outer plane form of the panel. Thus, it is a drawback that the cleaning of the appliance is complicated in the region of the filing element as the grip or handle perturbs the cleaning operation.

Therefore, it is an object of the invention to propose a water drawer of the kind mentioned above which can be attached to an appliance in an advantageous way and which can be used and operated safe and easy. A further object is to simplify the assembling process and the mounting process.

The solution of this object is characterized in that the water drawer comprises at least one driving element for providing or which provides a driving force for driving the drawer element to move into the second outer position.

Thus, a water drawer with a drawer element is provided, wherein the drawer element is driven out completely in a position where water can be filled in. The use of the water drawer, in particular the opening and closing becomes, thus, apparent for a user. The drawer element comes forth towards the user automatically. A flush optical appearance of the appliance where the water drawer is built in is possible. Further a compact water drawer is created which can be mounted as an entire assembly and wherein the opening for the water can be placed directly in the front area of the drawer.

According to a further advantageous embodiment of the invention the second outer position is a maximum extraction position.

Thus, a water drawer is created having a drawer element which is driven by a driving element into a maximum extraction position. The complete distance between first inner position and second outer position is covered by the applied driving force of the driving element. Therefore no pulling action is necessary until the maximum extraction position is reached.

Also the driving element is a resilient element and in that at least one driving device is provided which comprises at least one damper means for providing a damping force affecting on the drawer element when it is moved in a translational movement and wherein the resilient force and the damping force in combination define the speed and force of the translational movement of the drawer element.

The damper means is a rotational damper which engages into or cooperates with a rack element that is arranged on a first bottom section of the drawer element, in particular for forming a rack and pinion assembly. It is also possible that a linear damper is used without a rack. Further it is possible to arranged the rack on the lateral sides, on the top side and/or on the rear side of the drawer element.

The driving device comprises a spring, in particular a coil spring, which is provided for slowing down the translational movement of the drawer element at least in one direction of the translational movement in the last section of the translational movement, in particular before reaching a maximum extraction position.

Thus, the contamination of the system is reduced, because only an outer pushing cover has to be touched. The drawer element can be drawn in and out only by means of pushing action. Damper means are provided to create a smooth driving movement of the drawer element. A spring is provided for slowing down the drawer element before the maximum extraction position is reached in an extra smooth or soft way, speed of drawer element can be reduced in the last movement section in high quality effect.

Furthermore the housing element comprises at least one, preferably two, guiding grooves having a reduced diameter in their front region and wherein the drawer element comprises corresponding guiding means being guided within the interior of the guiding grooves, wherein each guiding means comprises at least one guiding rail.

At least one first guiding element which is arranged in a front region of the guiding rail, in particular wherein the first guiding element is formed as a slight curvature of the guiding rail having an ending protrusion extending vertically upwards.

Each guiding means comprises at least one second guiding element which is arranged in a rear region of the guiding rail, in particular wherein the second guiding element is formed as a vertical protrusion, forming with the guiding rail a substantially T-shaped form, wherein the T portion is in a lying position.

Such guiding arrangement for the drawer element in cooperation with the housing element allows a reliable and safe guiding of the drawer element within the housing element. Guiding grooves and guiding means can be manufactured easily, e.g. in a plastic forming process, such as an injection moulding process.

According to a further embodiment of the invention the first guiding element and the second guiding element are each in contact with the guiding groove and are dimensioned such that the first guiding element is in at least one point contact with the guiding groove and the second guiding element is in at least one point contact with the guiding groove, in particular wherein the point contacts are established between the slight curvature of the first guiding element and the guiding groove and between an upper or a lower tip of the crossbar of the T portion of the second guiding element.

The guiding arrangement is designed such that only point contacts between guiding means and guiding grooves are established. Thus, abrasion between housing element and drawer element is reduced to a minimum. Also tolerances are minimized in this way.

A further advantageous embodiment of the invention comprises that at least one guiding groove comprises a ramp formed in a front region, wherein the slight curvature of the first guiding element runs onto the ramp and is clamped thereto, in particular between ramp and another part of the guiding groove, when the drawer element reaches a maximum extraction position.

Thus, a structure is created which stops the drawer element in a smooth way, when it reaches the maximum extraction position. Further the necessary structures are easy to form to the housing element and the drawer element in a plastics forming process, such as an injection moulding process. The tolerances in the end position are reduced or avoided completely, so that the drawer element is in a firm position.

According to a further advantageous embodiment of the invention the driving device comprises a third guiding element which is in point contact to with a first bottom section of the drawer element Further the driving device comprises a noise reduction element, in particular a silicone damper, which reduces the noise when the stop hits the noise reduction element wherein a maximum extraction position of the drawer element is defined by a cooperation of the noise reduction element with a stop which is arranged at the drawer element.

A third guiding element improves the guiding arrangement even more. A noise reduction element reduces the noise of the lash of the drawer element on the stop and makes the arrangement more convenient for a user.

In a further embodiment of the invention the drawer element comprises a heart curve element with a heart curve and that the driving device comprises a movable hook which engages into the heart curve, wherein the movable hook can move in such way within the heart curve, that a pushing action by a user on the drawer element, in particular a pushing action on a pushing cover, transfers the drawer element from a first position into a second position and wherein a further pushing action by a user on the drawer element transfers the drawer element from a second position into a first position.

The use of a heart curve allows a latching or locking and releasing of the drawer element from the housing by pushing actions. The heart curve can advantageously interact with the further components of the water drawer.

Furthermore the at least one driving element is a rolled spring or a compression spring which is connected to the housing element and to the drawer element in such way, that the driving element is supported by the housing element for providing the resilient force for driving the drawer element.

The use of a rolled spring provides a sufficient large resilient force also over longer time periods. Additionally support means for supporting the spring are not needed, when the spring is supported on the housing element.

According to an alternative embodiment of the invention a water drawer, in particular according to one of the preceding claims, characterized in that the water drawer comprises at least one siphon assembly which forms a fluid connection between the housing element and a steam generating unit of a domestic appliance, wherein the siphon assembly comprises a main body and a cap body which form a conduit for the water providing a defined flow path, in particular having an inlet conduit section through which water is discharged, a first vertical conduit section through which the water flows along the flow path downwards, a second vertical conduit section through which the water flows along the flow path upwards and a third vertical conduit section through which the water flows along the flow path downwards and which are connected in series, and wherein the conduit comprises a condensation space wherein hot air and/or steam that flows back from the steam generating unit into the conduit can cool down and condense water therein, in particular formed by at least a part of the second vertical conduit section and/or the third vertical conduit section and/or wherein the main body and the cap body are two separate parts, wherein the cap body is at least partially insertable into the main body and wherein main body and cap body can be fastened to each other by a latch and/or wherein the siphon assembly comprises a vapour barrier against hot air and/or steam flowing back from the steam generating into the conduit.

Having such a siphon the water hot air or steam is prevented from streaming back from the steam generating unit into the drawer element and a vapour barrier is formed. Thus, operation of the water drawer is made more secure. The mounting of the siphon is very easy due to its two parts which are clipped together. Further the siphon can be mounted easily to the housing element of the water drawer. The special geometry of the siphon minimizes any density problems which normally are given by welded geometries. No special welding processes, e.g. laser welding, are necessary. The siphon prevents steam and vapour from reaching a space on the interior side of the front panel and thus, prevents the steam from coming out of the panel, in particular from gaps which are formed in the front cover or the appliance front.

The water drawer further can comprise snap elements and/or screw domes and/or fixation holes and/or additional holders to be formed to the siphon assembly for advantageously fastening the siphon assembly to the a component of the appliance or for providing further fixation means.

In the drawings an embodiment of the invention is depicted.

Figure 2:
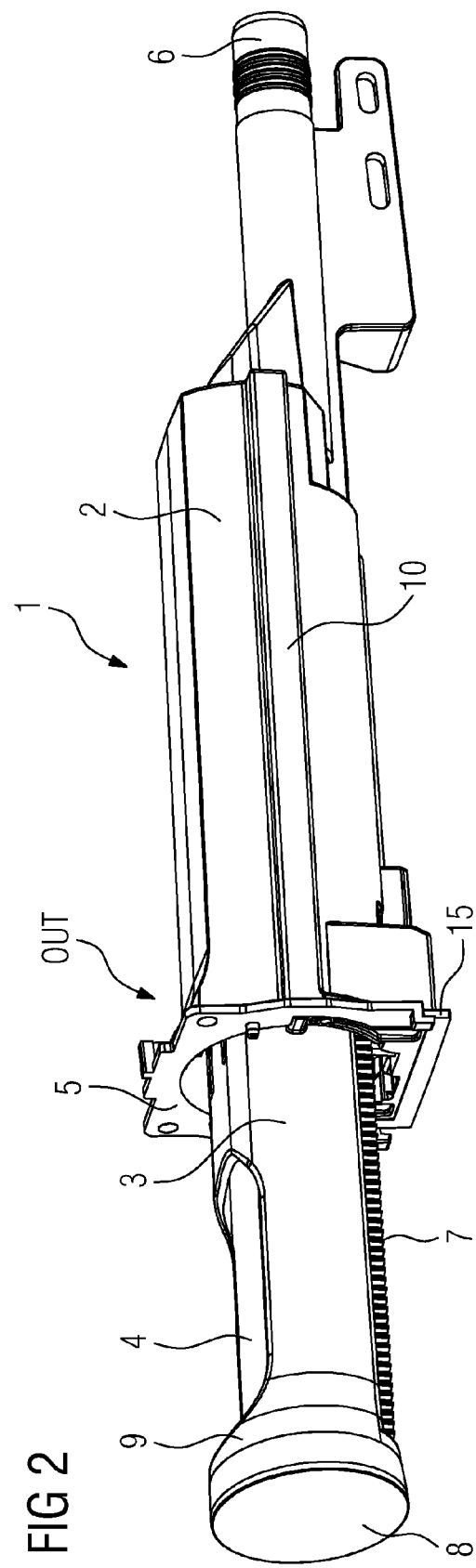
Figure 5:
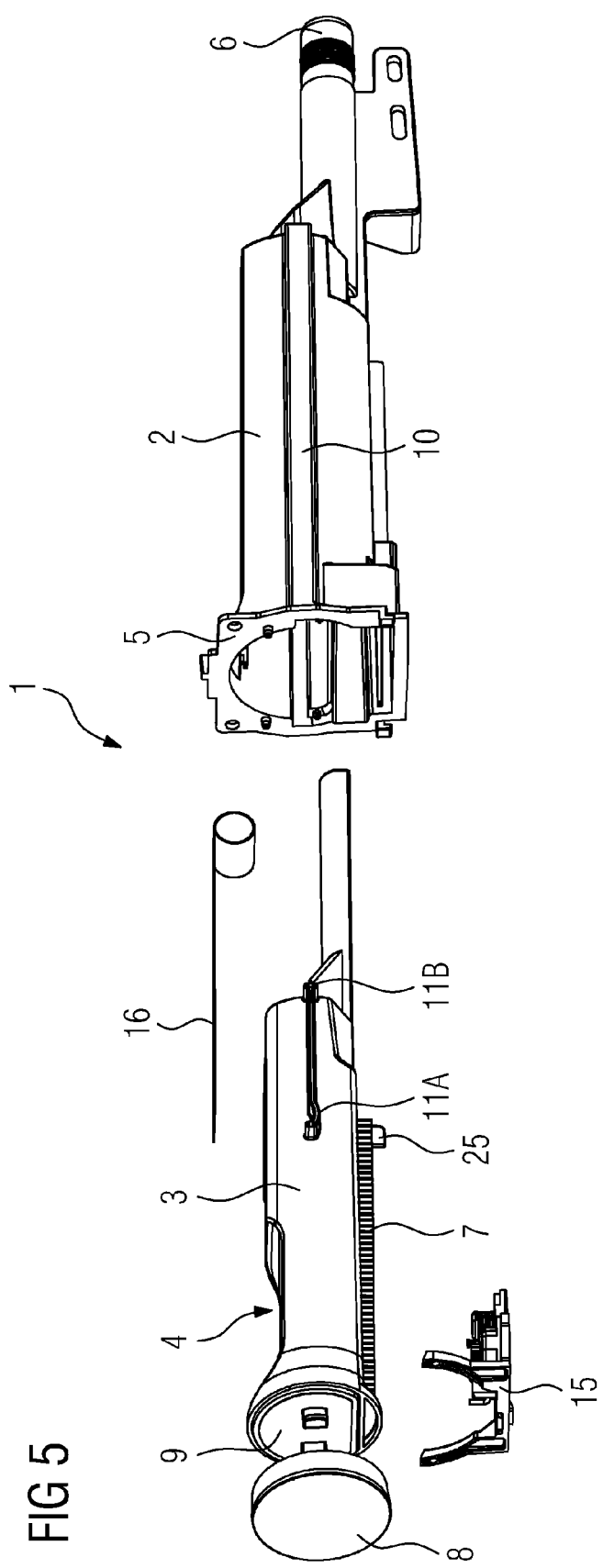
Figure 6:
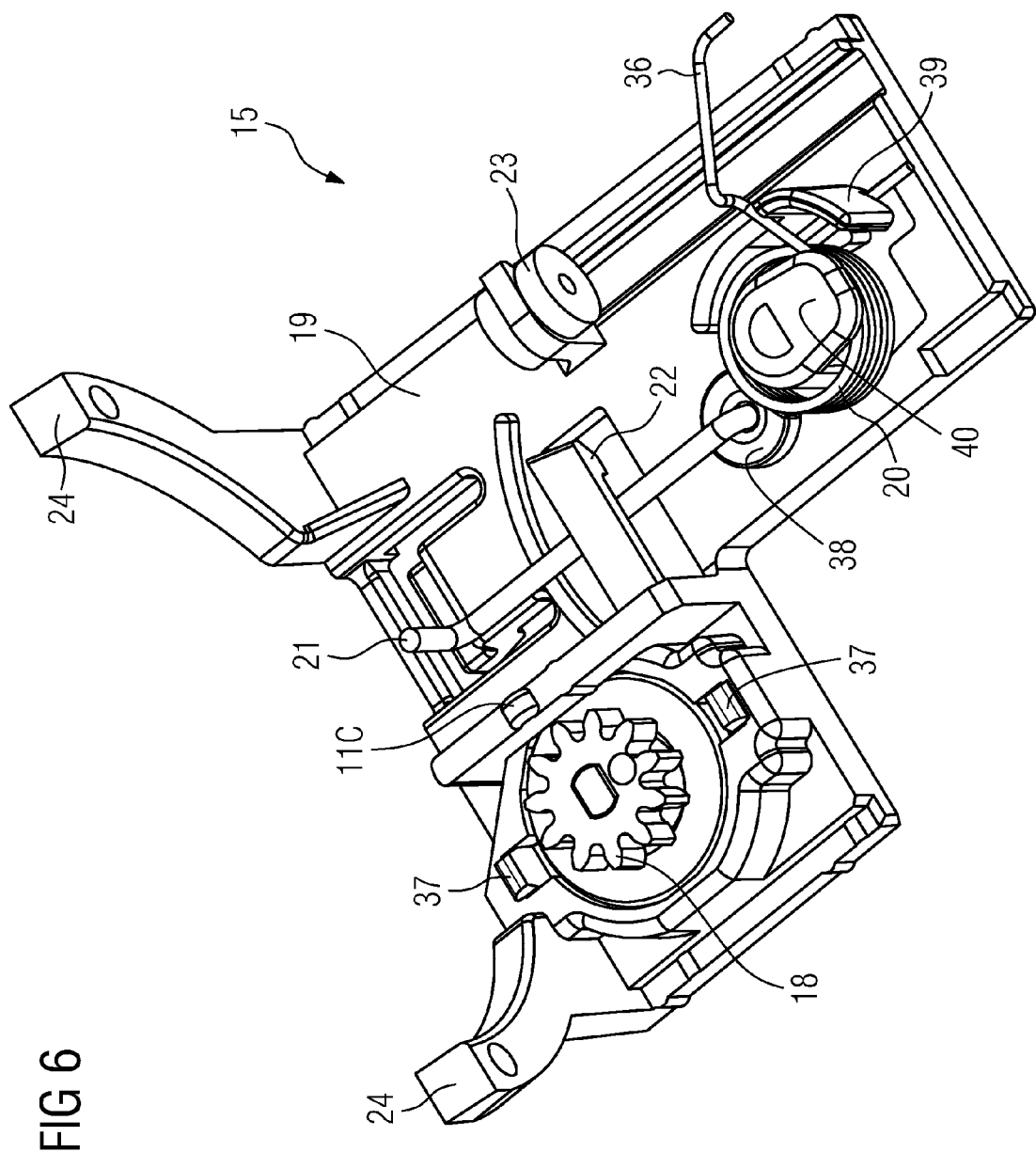
Figure 8A:
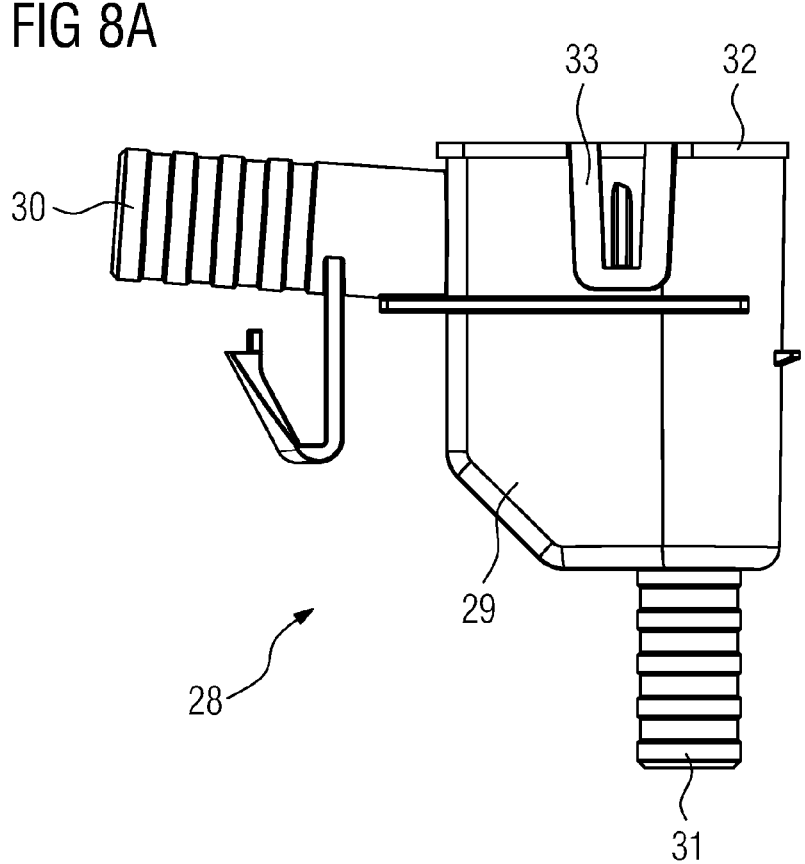
Figure 8B:
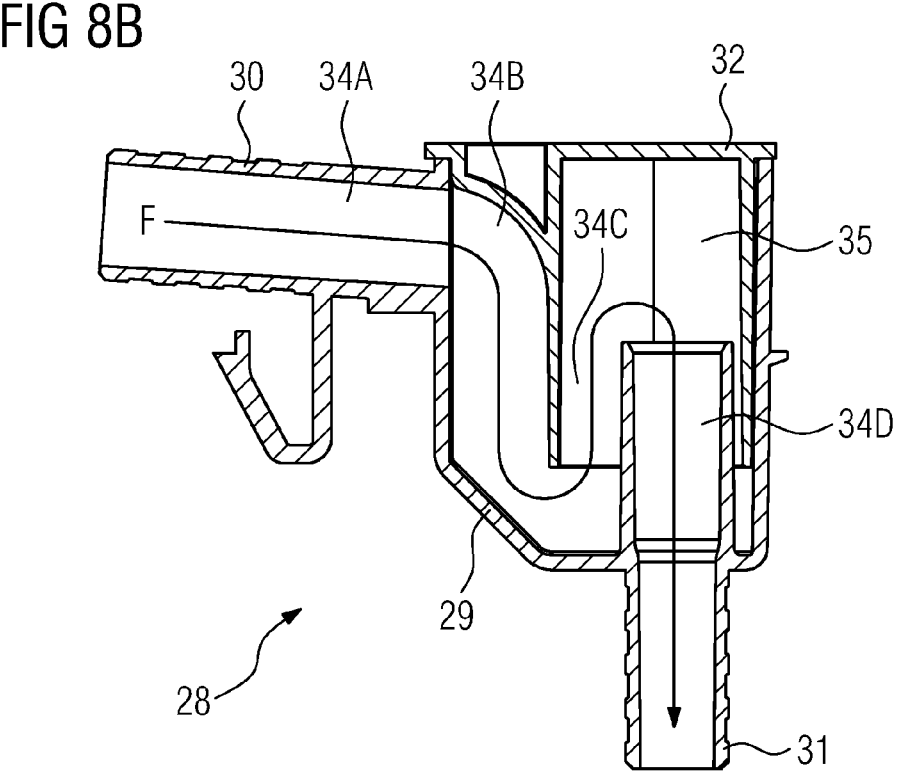

FIG. 1 shows a perspective view of a water drawer for a domestic steamer with a housing element and a drawer element, wherein the drawer element of the water drawer is in an idle position, FIG. 2 shows the same arrangement as FIG. 1, wherein the drawer element of the water drawer is in a filling position, FIG. 3 shows the same arrangement as FIG. 1 in a first sectional view in an idle position, wherein a part of the guiding arrangement for guiding the drawer element within the housing element is illustrated, FIG. 4 shows the same arrangement as FIG. 1 in a second sectional view in an idle position, wherein another part of the guiding arrangement for guiding the drawer element within the housing element is illustrated, FIG. 5 shows the same arrangement as FIG. 1 in an perspective exploded view, FIG. 6 shows a driving device having driving, damping and guiding means for providing a defined movement of the drawer element, FIG. 7 shows the same arrangement as FIG. 1 in a third sectional view in an idle position, wherein the housing element, the drawer element and the driving device are illustrated, FIG. 8A shows a side view of a siphon assembly being used for connecting the housing element with a steam generating unit of the domestic steamer, FIG. 8B shows a sectional view of a siphon assembly being used for connecting the housing element with a steam generating unit of the domestic steamer as FIG. 8A, FIG. 9 shows an exploded view of a siphon assembly being used for connecting the housing element with a steam generating unit of the domestic steamer as FIG. 8A and FIG. 8B, In FIG. 1 and FIG. 2 a water drawer 1 is shown, comprising a housing element 2 and a drawer element 3. The drawer element 3 in FIG. 1 is shown in a first (idle) position IN, which is a closed position, wherein the drawer element 3 in FIG. 2 is shown in a second (filling) position OUT, wherein a fluid, e.g. water, can be filled into the drawer element 3 through an opening 4. The drawer element 3 is formed as a hollow tubular element and able to receive and to transfer water to a steamer unit of a domestic steamer.

On a front end section of the housing element 2, a connecting flange 5 is arranged for connecting the water drawer to a front cover (not shown) of a domestic appliance or a cooking appliance. Alternatively the housing element 2 can be connected or fastened to a component carrier and/or to one or more side walls of the domestic appliance, e.g. the housing element 2 can be fixed to a front side and toe side walls. The water drawer is preferably connected to such a front cover in a way, that a pushing cover 8 of the water drawer 1 is arranged flush to the front cover of the domestic appliance.

The pushing cover 8 is attached to the drawer element 3 by means of an adapter 9. Different pushing covers 8 having different designs can be attached to the adapter 9 which enables the user to distinguish different brands.

The housing element 2 has one guiding groove 10 on each side wall, wherein guiding means of the drawer element 2 to be described later are guided. A driving device 15 having driving, damping and guiding means for providing a defined movement of the drawer element 2 is mounted to a bottom side of the housing element.

On a rear end section of the housing element 2, the housing element is formed as a coupling section 6. Fluid guiding means, e.g. a conduit such as a tube or a hose can be connected thereto for guiding the water from the drawer element to the steam generating unit of the domestic appliance.

On a bottom section of the drawer element 3, a rack element 7 is arranged which cooperates with the driving device 15.

FIG. 3 shows a water drawer 1 according to FIG. 1 and FIG. 2 in a first sectional view such that the lateral guiding arrangement of the drawer element 3 in cooperation with the guiding groove 10 of the housing element is illustrated. The drawer element 3 is in a maximum extraction position. The drawer element 3 is in a second (filling) position OUT. Water can be filled through the opening 4 into the interior of the drawer element 3.

As can be seen the pushing cover 8 is attached to the drawer element 3 via the adapter 9 and on a first bottom section 13 of the drawer element 3, a rack element 7 is arranged. The rack element 7 is shaped as a gear rod enabled to form a rack and pinion assembly in cooperation with one or more parts of the driving device 15.

The side wall of the housing element 2 comprises a guiding groove 10 extending horizontally along the complete side wall of the housing element 2. The drawer element 3 comprises guiding means which are attached or formed to a side wall of the drawer element 3. The guiding means comprise a guiding rail which is guided in the interior of the guiding groove 10.

In a front region of the guiding rail, a first guiding element 11A is formed. The first guiding element 11A comprises a slight curvature of the guiding rail and ends in a protrusion extending vertically upwards.

In a rear region of the guiding rail, a second guiding element 11B is formed. The second guiding element 11B comprises a vertical protrusion and comprises a substantially T-shaped form, wherein the T is in a lying position. First and second guiding element 11A, 11B are each in contact with the guiding groove 10 and are dimensioned such that at the first guiding element 11A is in at least one point contact with the guiding groove and the second guiding element 11B is in at least one point contact with the guiding groove. In particular, the point contacts shall be established between the slight curvature of the first guiding element 11A and the guiding groove and between the upper or the lower tip of the crossbar of the T of the second guiding element 11B.

Further on a front region of the guiding groove 10 a ramp 12 is formed. The ramp 12 is formed by the supporting arms 24 of the driving device 15 wherein the supporting arms 24 engage through recesses of the housing element 2 and are thus provided on the interior front end of the guiding groove 10. When the drawer element 2 is moved into an second (filling) position OUT, a maximum extraction position can be reached. In this maximum extraction position, the slight curvature of the first guiding element 11A runs onto the ramp and the first guiding element 11A is clamped by means of the slight curvature on the ramp 12 and the end tip of the vertical protrusion. Advantageously the tolerances are reduced or minimized in the end position and consequently the first guiding element 11A and the drawer element 3 is not loose. In other words, the guiding groove is formed in its front region as a V-shape which works as an extraction stop by form closure for the guiding rail of the drawer element and wherein the first guiding element 11A is stopped smoothly due to the damper 18 and the spring 20. Thus, the drawer element 2 is prevented from being drawn out completely and a maximum extraction position is defined for the drawer element 2.

FIG. 4 shows a water drawer 1 according to FIG. 3 in a second sectional view, such that the lateral guiding arrangement of the drawer element 3 in cooperation with the guiding groove 10 of the housing element is illustrated. Also here the drawer element 3 is in a maximum extraction position. The drawer element 2 is in a second (filling) position OUT. Water can be filled through the opening 4 into the interior of the drawer element 3.

A bottom of the drawer element 3 comprises a first bottom section 13 where the rack element 7 is arranged and a second bottom section where the rack element 7 is not arranged.

A rear region of the drawer element 3 is always positioned within the housing element 2. The rear region of the drawer element 3 is further formed as an outlet 26 through which water is guided from the water drawer into a conduit part of the housing element 2 and to the coupling section 6.

In a space between housing element 2 and drawer element 3 a driving element 16, e.g. a rolled spring or a compression spring is arranged. The driving element 16 is mounted to the water drawer 1 in such way that one end section is connected to the housing element 2 and another end section is connected to the drawer element 3. The driving element 16 is always under tension and effects a permanent force on the drawer element 3 in direction to the second (filling) position OUT.

The drawer element 3 comprises a forming 17 which is adapted to the driving element 16 that has the shape of a rolled spring so that the driving element 16 can be received in between the housing element 2 and the drawer element 3 and such that the driving element 16 effects a driving force via the forming 17 onto the drawer element 3.

The driving device 15 comprises a third guiding element 11C which forms a point contact with the first bottom section 13 when the drawer element 3 is drawn in or out of the housing element 2. Thus, the in addition to the first and second guiding element 11A, 11B a further guiding element makes a more stable and reliable guiding of the drawer element 3 possible.

FIG. 5 shows a water drawer 1 according to FIG. 1 in an exploded view.

The housing element 2 with lateral guiding grooves 10 and a connecting flange 5 is provided, having a coupling section.

Further the drawer element 3 has an opening 4, a rack element 7 and first and second guiding elements 11A, 11B. On the bottom part of the drawer element 3 a stopper 25 is arranged. The front section of the drawer element 3 is provided with the adapter 9 to which the pushing cover 8 can be attached.

As further elements the driving element 16 and the driving device 15 are shown.

FIG. 6 shows the driving device 15. The driving device 15 has a base plate 19, whereupon the further elements are mounted. Supporting arms are formed to the base plate for fastening the base plate to the housing element 2 of the water drawer 1.

Damper means 18 are formed as a rotational damper and provided upon the base plate 19. The damper means can be mounted removable to the base plate 19 by snap elements 37. The damping characteristics of the damper means 18 in cooperation with the driving element 16 define the opening and closing time, speed and force of the drawing movement of the water drawer 1.

A spring 20 formed as a coil spring is mounted to the base plate 19 by means of spring support 40 and is provided for slowing down the movement of the drawer element 2 in the last section of the drawing or translational movement before reaching the maximum extraction position. An end section of the spring 20 is formed as a catch 36 which catches the drawer element (3) in the last section of the translational movement. A spring block 39 holds the catch 36 in a defined position.

A noise reducing element 23, e.g. a silicone damper, prevents the generation of noise, when the stopper 25 hits the noise reducing element 23 and stops the drawing movement of the drawer element 2 when the maximum extraction position is reached.

Further the third guiding element 11C can be seen which is arranged on a rib or protrusion.

A movable hook 21 is arranged on the base plate 19 being able to pivot around one end that is attached movably to the base plate 19 in a rotatable mount 38. The pivot movement is restricted by means of a restricting element 22 to a certain angular range.

FIG. 7 shows a water drawer 1 in a third sectional view in a first (idle) position IN, i.e. wherein the drawer element 3 is in a closed position. In this position the driving element 16 is received in the free space between the drawer element 3 and the housing element 2 which is at least partly provided by the forming 17 arranged on the drawer element 3.

The outlet 26 of the drawer element 3 is positioned adjacent to the coupling section 6, wherein the pushing cover 8 and/or adapter 9 lie against a front cover of the domestic appliance and/or against the coupling flange 5.

The driving device 15 is mounted or fastened to a bottom part of the housing element 2. A heart curve element 27 is mounted or formed to the bottom part of the drawer element 3 in a first bottom section 13. The movable hook 21 engages into a heart curve of the heart curve element 27.

In a synopsis of the above described figures the function of the water drawer 1 and its components becomes clear. In a first (idle) position IN of the drawer element 2 a user can push the drawer element 3 by pushing the pushing cover 8 in over a defined distance. The driving element 16 is loaded or compressed, respectively, the movable hook 21 moves along the heart curve of the heart curve element 27 until it leaves the heart curve. Subsequently, the driving element 16 forces the drawer element 3 to move into the second (filling) position OUT. During the movement of the drawer element 3 in direction of the maximum extraction position, the damper means 18 engage into the rack element 7 and is always in contact with the rack element 7. The combination of the force of the driving element 16 and the damping force of the damper means 18 results in the speed of the movement of the drawer element 3.

Before the drawer element 3 reaches the maximum extraction position, the spring 20 acts on the drawer element 3 and provides a further damping force additionally to the damping forces provided by the damper means 18. Reaching the noise reducing element 23 the drawer element 3 is stopped smoothly and the maximum extraction position is reached. In this position the user can fill in water.

After the filling procedure, the drawer element 3 is closed manually. The force which the user has to transfer to the drawer element 3 must be larger than the combined forces of damping means 18 and driving element 16. After reaching the first position IN again, the movable hook engages into the heart curve and comes into a locking position, locking the drawer element 3 in the first (idle) position IN.

FIG. 8A and FIG. 8b show a siphon assembly for being used for connecting the housing element 2 with a steam generating unit of the domestic steamer which is applied in the domestic appliance. The siphon 28 comprises a main body 29 to an inlet connector 30 and an outlet connector 31 are coupled. A cap body 32 can be inserted into the main body 29 which closes the main body in an upper region. The connection between the main body 29 and the cap body 32 is fastened by means of a latch 33. For the connection of the siphon 28 with the steam generating unit tubes are provided.

A notch or snapping leg is arranged at the inlet connector 30 for connecting and/or fastening the main body 29 of the siphon assembly 28 to the coupling section 6 of the housing element 2.

The interior space of the siphon 28 comprises a conduit for guiding water from the inlet connector 30 to the outlet connector 31. The conduit is formed by barriers or walls which are formed to the main body 29 and the cap body 32. The flow path of the water that is guided within the conduit is indicated with F.

The siphon 28 is provided for creating a vapour barrier which prevents hot steam from flowing back into the housing element 2 and/or the drawer element 3. Thus, vapour or steam coming out through gaps on the appliance front is prevented and the electronic components which are arranged on or at the front panel are protected from the vapour or steam. Water which flows along the flow path F flows in the following order through an inlet conduit section 34A and through a first vertical conduit section 34B wherein the water flows in a downward direction. Then the flow path F is deflected into a second vertical conduit section 34C wherein the water flows in an upward direction and into a third vertical conduit section 34D wherein the water flows in a downward direction and into the outlet connector 31.

Optionally a condensation space 35 is formed in a transition section between second vertical conduit section 34C and third vertical conduit section 34D. In an operation mode of the steam generating unit, hot air and/or steam can accidentally stream back into the siphon 28. The hot air and/or steam cannot enter the second vertical conduit 34C, because, under regular conditions, the hot air and/or steam ascends in an upward direction and does not descend into the second vertical conduit 34D without additional force or pressure. Therefore the hot air and/or steam cools down in the condensation space 35 and the water of the hot air and/or steam condenses within the condensation space 35.

FIG. 9 shows the siphon 28 in an exploded view. The cap body 32 comprises a latch 33 for fastening the cap body 32 to the main body 29. The main body comprises inlet connector 30 and outlet connector 31. The cap body 32 can be inserted into the main body 29 for forming an upper closure.

REFERENCE NUMERALS

1 Water drawer
2 Housing element
3 Drawer element
4 Opening
5 Connecting flange
6 Coupling section
7 Rack element
8 Pushing cover
9 Adapter
10 Guiding groove
11A, 11B, 11C First, second, third guiding element
12 Ramp
13 First bottom section
14 Second bottom section
15 Driving device
16 Driving element
17 Forming
18 Damper means
19 Base plate
20 Spring
21 Movable hook
22 Restricting element
23 Noise reducing element
24 Supporting arms
25 Stopper
26 Outlet
27 Heart curve element
28 Siphon assembly
29 Main body
30 Inlet connector
31 Outlet connector
32 Cap body
33 Latch
34A Inlet conduit section
34B First vertical conduit section
34C Second vertical conduit section
34D Third vertical conduit section
35 Condensation space
36 Catch
37 Snap elements
38 Rotatable mount
39 Spring block
40 Spring support
IN First position (idle position)
OUT Second position (filling position)
F Flow path

The invention claimed is:

1. Water drawer (1), comprising a housing element (2) and a drawer element (3), wherein the drawer element (3) is movably guided within the housing element (2) and wherein water can be filled into a water receiving space of the drawer element (3), wherein the drawer element (3) can be moved in a translational movement between a first inner position (IN) and a second outer position (OUT), wherein the water drawer (1) further comprises at least one driving element (16) that is a resilient element for providing a driving force on the drawer element (3) for driving the drawer element (3) to move into the second outer position (OUT), and at least one driving device (15) separate from the at least one driving element (16) which comprises at least one damper means (18) for providing a damping force on the drawer element (3) that opposes the driving force when the drawer element (3) is moved translationally and wherein the driving force and the damping force in combination define the speed and force of the translational movement of the drawer element (3), said at least one driving element (16) being a rolled spring or a compression spring connected to the housing element (2) and to the drawer element (3) in such a way that the driving element (16) is supported by the housing element (2) for providing the resilient force for driving the drawer element (3), and the housing element (2) comprises a space for receiving the drawer element (3) that has a shape that substantially corresponds to the outer shape of the drawer element (3).

2. Water drawer (1) according to claim 1, wherein the housing element (2) comprises at least one guiding groove (10), wherein each guiding groove (10) has a reduced diameter in its front region and wherein the drawer element (3) comprises corresponding guiding means being guided within the interior of each guiding groove (10), wherein each guiding means comprises at least one guiding rail and at least one first guiding element (11A) which is arranged in a front region of the guiding rail, wherein the first guiding element (11A) is formed as a slight curvature of the guiding rail having an ending protrusion extending vertically upwards.

3. Water drawer (1) according to claim 2, wherein each guiding means comprises at least one second guiding element (11B) which is arranged in a rear region of the guiding rail, wherein the second guiding element (11B) is formed as a vertical protrusion, forming with the guiding rail a substantially T-shaped form, wherein the T portion is in a lying position.

4. Water drawer (1) according to claim 2, wherein the at least one guiding groove (10) comprises a ramp (12) formed in a front region, wherein the slight curvature of the first guiding element (11A) runs onto the ramp (12) and is clamped thereto between ramp (12) and another part of the guiding groove (10) when the drawer element (3) reaches a maximum extraction position.

5. Water drawer (1) according to claim 3, wherein the driving device (15) comprises a third guiding element (11C) which is in point contact to a first bottom section (13) of the drawer element (3).

6. Water drawer (1) according to claim 1, wherein the drawer element (3) comprises a heart curve element (27) with a heart curve and that the driving device (15) comprises a movable hook (21) which engages into the heart curve, wherein the movable hook (21) can move in such way within the heart curve that a pushing action by a user on the drawer element (3) transfers the drawer element (3) from a first position (IN) into a second position (OUT) and wherein a further pushing action by a user on the drawer element (3) transfers the drawer element (3) from a second position (OUT) into a first position (IN).

7. Water drawer (1), comprising a housing element (2) and a drawer element (3), wherein the drawer element (3) is movably guided within the housing element (2) and wherein water can be filled into a water receiving space of the drawer element (3), wherein the drawer element (3) can be moved in a translational movement between a first inner position (IN) and a second outer position (OUT), wherein the water drawer (1) further comprises at least one driving element (16) that is a resilient element for providing a driving force on the drawer element (3) for driving the drawer element (3) to move into the second outer position (OUT), and at least one driving device (15) separate from the at least one driving element (16) which comprises at least one damper means (18) for providing a damping force on the drawer element (3) that opposes the driving force when the drawer element (3) is moved translationally and wherein the driving force and the damping force in combination define the speed and force of the translational movement of the drawer element (3), the housing element (2) comprising a space for receiving the drawer element (3) that has a shape that substantially corresponds to the outer shape of the drawer element (3), and at least one siphon assembly (28) which forms a fluid connection between the housing element (2) and a steam generating unit of a domestic appliance, wherein the siphon assembly (28) comprises a main body (29) and a cap body (32) which form a conduit for the water providing a defined flow path (F) having an inlet conduit section (34A) through which water is discharged, a first vertical conduit section (34B) through which the water flows along the flow path (F) downwards, a second vertical conduit section (34C) through which the water flows along the flow path (F) upwards and a third vertical conduit section (34D) through which the water flows along the flow path (F) downwards and which are connected in series, and wherein the conduit comprises a condensation space (35) wherein hot air or steam that flows back from the steam generating unit into the conduit can cool down and condense water therein formed by at least a part of the second vertical conduit section (34C) or the third vertical conduit section (34D).

8. Water drawer (1) according to claim 7, wherein snap elements, screw domes, fixation holes, or additional holders are formed to the siphon assembly (28).

9. Appliance comprising a water drawer (1) according to claim 1.

10. Appliance according to claim 9, wherein the appliance is a cooking appliance with steam function.

11. Water drawer (1) according to claim 1, wherein the second outer position (OUT) is a maximum extraction position.

12. Water drawer (1) according to claim 1, wherein the damper means (18) is a rotational damper which engages into or cooperates with a rack element (7) that is arranged on a first bottom section (13) of the drawer element (3) for forming a rack and pinion assembly.

13. Water drawer (1) according to claim 1, wherein the driving device (15) comprises a spring (20) which is provided for slowing down the translational movement of the drawer element (3) at least in one direction of the translational movement in the last section of the translational movement before reaching a maximum extraction position.

14. Water drawer (1) according to claim 2, wherein the housing element (2) comprises at least two guiding grooves (10).

15. Water drawer (1) according claim 3, wherein the first guiding element (11A) and the second guiding element (11B) are each in contact with the guiding groove (10) and are dimensioned such that the first guiding element (11A) is in at least one point contact with the guiding groove and the second guiding element (11B) is in at least one point contact with the guiding groove, wherein the point contacts are established between the slight curvature of the first guiding element (11A) and the guiding groove and between an upper or a lower tip of the crossbar of the T portion of the second guiding element (11B).

16. Water drawer (1) according to claim 5, wherein the driving device (15) comprises a noise reduction element (23) which reduces the noise when a stop (25) which is arranged at the drawer element (3) hits the noise reduction element (23), wherein a maximum extraction position of the drawer element (3) is defined by a cooperation of the noise reduction element (23) with the stop (25).

17. Water drawer (1) according to claim 7, wherein the main body (29) and the cap body (32) are two separate parts, wherein the cap body (32) is at least partially insertable into the main body (29) and wherein main body (29) and cap body (32) can be fastened to each other by a latch (33).

18. Water drawer (1) according to claim 7, wherein the siphon assembly (28) comprises a vapour barrier against hot air or steam flowing back from the steam generating unit into the conduit.

19. Water drawer (1), comprising a housing element (2), wherein the water drawer comprises at least one siphon assembly (28) which forms a fluid connection between the housing element (2) and a steam generating unit of a domestic appliance, wherein the siphon assembly (28) comprises a main body (29) and a cap body (32) which form a conduit for the water providing a defined flow path (F) having an inlet conduit section (34A) through which water is discharged, a first vertical conduit section (34B) through which the water flows along the flow path (F) downwards, a second vertical conduit section (34C) through which the water flows along the flow path (F) upwards and a third vertical conduit section (34D) through which the water flows along the flow path (F) downwards and which are connected in series, and wherein the conduit comprises a condensation space (35) wherein hot air or steam that flows back from the steam generating unit into the conduit can cool down and condense water therein, said condensation space (35) being formed at least in part in a transition section between the second vertical conduit section (34C) and the third vertical conduit section (34D), wherein the transition section is above the second vertical conduit section (34C) and the third vertical conduit section (34D).

20. Water drawer (1) according to claim 19, wherein the main body (29) and the cap body (32) are two separate parts, wherein the cap body (32) is at least partially insertable into the main body (29) and wherein main body (29) and cap body (32) can be fastened to each other by a latch (33).

21. Water drawer (1) according to claim 19, wherein the siphon assembly (28) comprises a vapour barrier against hot air or steam flowing back from the steam generating unit into the conduit.

22. Water drawer (1) according to claim 19, wherein snap elements, screw domes, fixation holes, additional holders are formed to the siphon assembly (28).

23. Water drawer (1) according to claim 19, further comprising a drawer element (3), wherein the drawer element (3) is movably guided within the housing element (2) and wherein water can be filled into a water receiving space of the drawer element (3), wherein the drawer element (3) can be moved in a translational movement between a first inner position (IN) and a second outer position (OUT), wherein the water drawer (1) further comprises at least one driving element (16) for providing a driving force for driving the drawer element (3) to move into the second outer position (OUT).

24. Water drawer (1) according claim 23, wherein the second outer position (OUT) is a maximum extraction position.

25. Water drawer (1) according to claim 23, wherein the driving element (16) is a resilient element, wherein at least one driving device (15) is provided which comprises at least one damper means (18) for providing a damping force affecting on the drawer element (3) when it is moved in a translational movement and wherein the resilient force and the damping force in combination define the speed and force of the translational movement of the drawer element (3).

26. Water drawer (1) according to claim 23, wherein the at least one damper means (18) is a rotational damper which engages into or cooperates with a rack element (7) that is arranged on a first bottom section (13) of the drawer element (3) for forming a rack and pinion assembly.

27. Water drawer (1) according to claim 23, wherein the driving device (15) comprises a spring (20) which is provided for slowing down the translational movement of the drawer element (3) at least in one direction of the translational movement in the last section of the translational movement before reaching a maximum extraction position.

28. Water drawer (1) according to claim 23, wherein the housing element (2) comprises at least one guiding groove (10), wherein each guiding groove (10) has a reduced diameter in its front region and wherein the drawer element (3) comprises corresponding guiding means being guided within the interior of each guiding groove (10),
wherein each guiding means comprises at least one guiding rail and at least one first guiding element (11A) which is arranged in a front region of the guiding rail.

29. Water drawer (1) according to claim 28, wherein each guiding means comprises at least one second guiding element (11B) which is arranged in a rear region of the guiding rail, wherein the second guiding element (11B) is formed as a vertical protrusion, forming with the guiding rail a substantially T-shaped form, wherein the T portion is in a lying position.

30. Water drawer (1) according to claim 29, wherein the first guiding element (11A) and the second guiding element (11B) are each in contact with the guiding groove (10) and are dimensioned such that the first guiding element (11A) is in at least one point contact with the guiding groove and the second guiding element (11B) is in at least one point contact with the guiding groove, wherein the point contacts are established between the slight curvature of the first guiding element (11A) and the guiding groove and between an upper or a lower tip of the crossbar of the T portion of the second guiding element (11B).

31. Water drawer (1) according to claim 29, wherein at least one guiding groove (10) comprises a ramp (12) formed in a front region, wherein the slight curvature of the first guiding element (11A) runs onto the ramp (12) and is clamped thereto between ramp (12) and another part of the guiding groove (10) when the drawer element (3) reaches a maximum extraction position.

32. Water drawer (1) according claim 29, wherein the driving device (15) comprises a third guiding element (11C) which is in point contact to a first bottom section (13) of the drawer element (3).

33. Water drawer (1) according to claim 25, wherein the driving device (15) comprises a noise reduction element (23) which reduces the noise when a stop (25) which is arranged at the drawer element (3) hits the noise reduction element (23), wherein a maximum extraction position of the drawer element (3) is defined by a cooperation of the noise reduction element (23) with the stop (25).

34. Water drawer (1) according claim 25, wherein the drawer element (3) comprises a heart curve element (27) with a heart curve, wherein the driving device (15) comprises a movable hook (21) which engages into the heart curve, wherein the movable hook (21) can move in such way within the heart curve that a pushing action by a user on the drawer element (3) transfers the drawer element (3) from a first position (IN) into a second position (OUT) and wherein a further pushing action by a user on the drawer element (3) transfers the drawer element from a second position (OUT) into a first position (IN).

35. Water drawer (1) according claim 23, wherein the at least one driving element (16) is a rolled spring or a compression spring which is connected to the housing element (2) and to the drawer element (3) in such a way that the driving element (16) is supported by the housing element (2) for providing the resilient force for driving the drawer element (3).

36. Cooking appliance with steam function, comprising a water drawer (1) according to claim 19.

37. Water drawer (1) for introducing water to a steam generating unit, comprising a housing element (2), a drawer element (3), a driving element (16), a driving device (15), and a siphon assembly (28);
the housing element (2) comprising:
    a space for receiving the drawer element (3) having a shape that substantially corresponds to the shape of the drawer element (3),
    a coupling section (6) for connecting the housing element (2) to the siphon assembly (28), and
    a plurality of guiding grooves for guiding the drawer element (3) within the housing element (2);
wherein the drawer element (3) can be moved in a translational movement between a first inner position (IN) and a second outer position (OUT) with respect to the housing element (2);
the drawer element (3) comprising:
    a water receiving space comprising an opening (4),
    a rack element (7) arranged on a bottom section (13) of the drawer element (3) for engaging a component of the driving device (15) to translationally move the drawer element (3) between the first inner position (IN) and the second outer position (OUT),
    a heart curve element (27) that engages a component of the driving device (15) to lock the drawer element (3) in the first inner position (IN), and
    guiding rails that engage the interior of the guiding grooves (10);
wherein the driving element (16) is a resilient element that provides a driving force on the drawer element (3) that drives the drawer element (3) from the first inner position (IN) to the second outer position (OUT);
the driving device (15) comprising:
    a damper means (18) that engages the rack element (7) of the drawer element (3) and provides a first damping force on the drawer element (3) that opposes the driving force when the drawer element is moved from the first inner position (IN) to the second outer position (OUT), wherein the driving force and the first damping force in combination define the speed and force of the translational movement of the drawer element (3), a catch (36) coupled to a spring (20) for engaging the drawer element (3) to provide a second damping force on the drawer element (3), wherein the catch (36) engages the drawer element (3) when it moves from the first inner position (IN) to the second outer position (OUT) to provide the second damping force to slow down the speed of movement before the drawer element reaches the second outer position (OUT), and a movable hook (21) for engaging the heart curve element (27) of the drawer element (3); wherein pushing the drawer element (3) from the second outer position (OUT) to the first inner position (IN) results in the movable hook (21) engaging the heart curve element (27) such that the drawer element (3) is locked within the housing element (2), and wherein pushing the drawer element (3) when the drawer element (3) is locked results in the movable hook (21) disengaging the heart curve element (27);

said siphon assembly (28) forming a fluid connection between the housing element (2) and the steam generating unit, the siphon assembly (28) comprising:

an inlet connector (30) for engaging the coupling section (6) of the housing element (2) to form a fluid connection between the housing element (2) and the siphon assembly (28), an outlet connector (31) that forms a fluid connection between the siphon assembly (28) and the steam generating unit, and a conduit that provides a defined flow path (F) between the inlet connector (30) and the outlet connector (31), said conduit comprising a condensation space (35) wherein steam that flows back from the steam generating unit can cool down and condense therein.

38. Domestic appliance comprising a steam generating unit and a water drawer (1) for introducing water to the steam generating unit, the water drawer (1) comprising a housing element (2), a drawer element (3), a driving element (16) and a driving device (25);

the housing element (2) comprising:

a space for receiving the drawer element (3);

wherein the drawer element (3) can be moved in a translational movement between a first inner position (IN) and a second outer position (OUT) with respect to the housing element (2);

the drawer element (3) comprising:

a water receiving space comprising an opening (4) through which water can be filled into the water receiving space when the drawer element is in the second outer position (OUT), a pushing cover (8), wherein the pushing cover (8) is flush with a front cover of the domestic appliance when the drawer element (3) is in the first inner position (IN), and a heart curve element (27);

the driving device (15) comprising a movable hook (21), wherein the driving element (16) is a resilient element that provides a driving force on the drawer element (3) that drives the drawer element (3) from the first inner position (IN) to the second outer position (OUT);

wherein the movable hook (21) and the heart curve element (27) engage one another to lock the drawer element (3) in the first inner position (IN) when the pushing cover (8) is pushed inward from the second outer position (OUT) past the first inner position (IN), and to unlock the drawer element (3) when the pushing cover (8) is pushed inward from the first inner position (IN).

* * * * *